No. 876,012. PATENTED JAN. 7, 1908.
P. POYNEER.
FANNING MILL.
APPLICATION FILED DEC. 13, 1906.
2 SHEETS—SHEET 1.
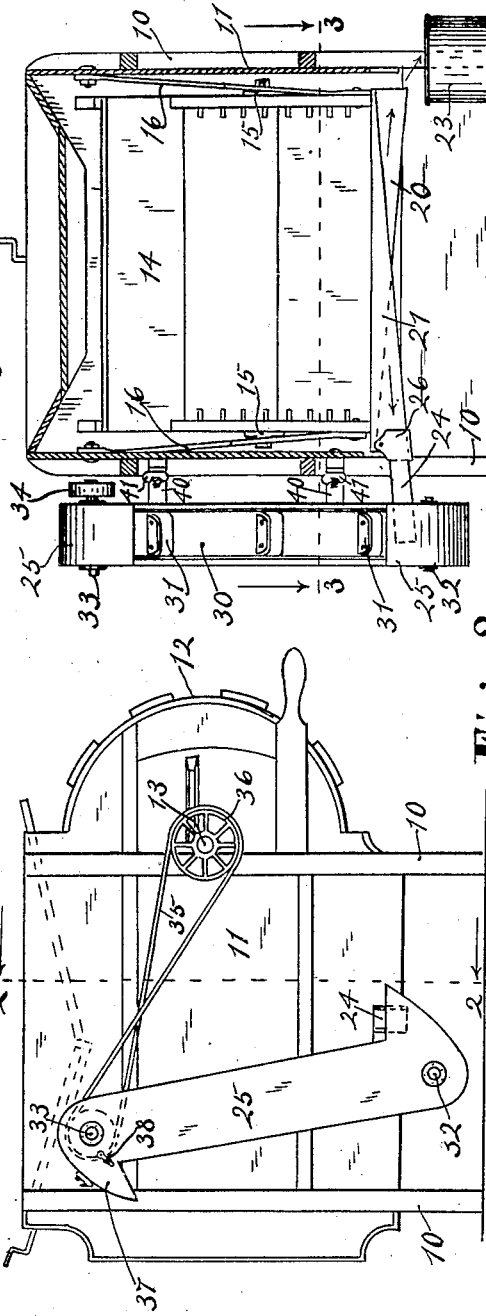
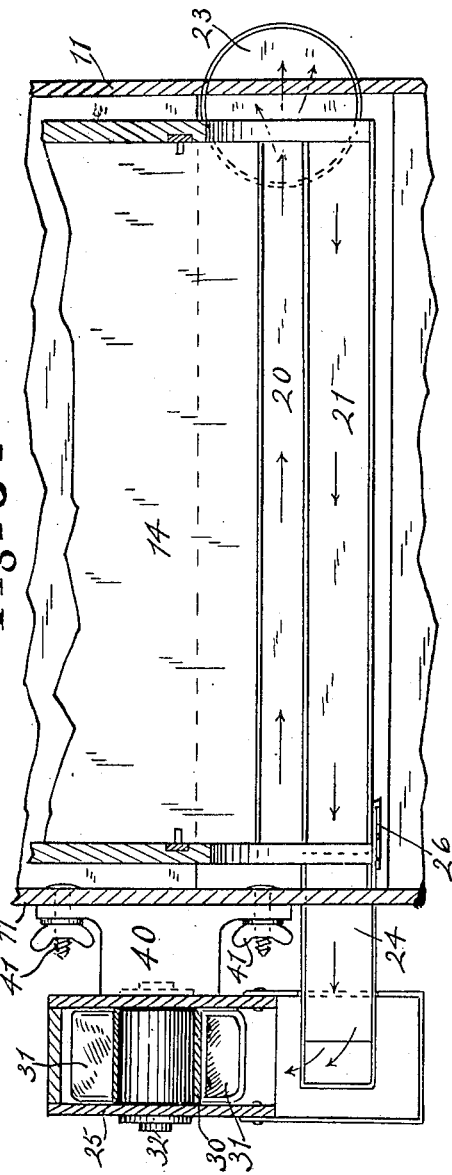
WITNESSES:
INVENTOR.
Perry Poyneer.
BY
ATTORNEY.

No. 876,012.
PATENTED JAN. 7, 1908.
P. POYNEER.
FANNING MILL.
APPLICATION FILED DEC. 13, 1906.
2 SHEETS—SHEET 2.
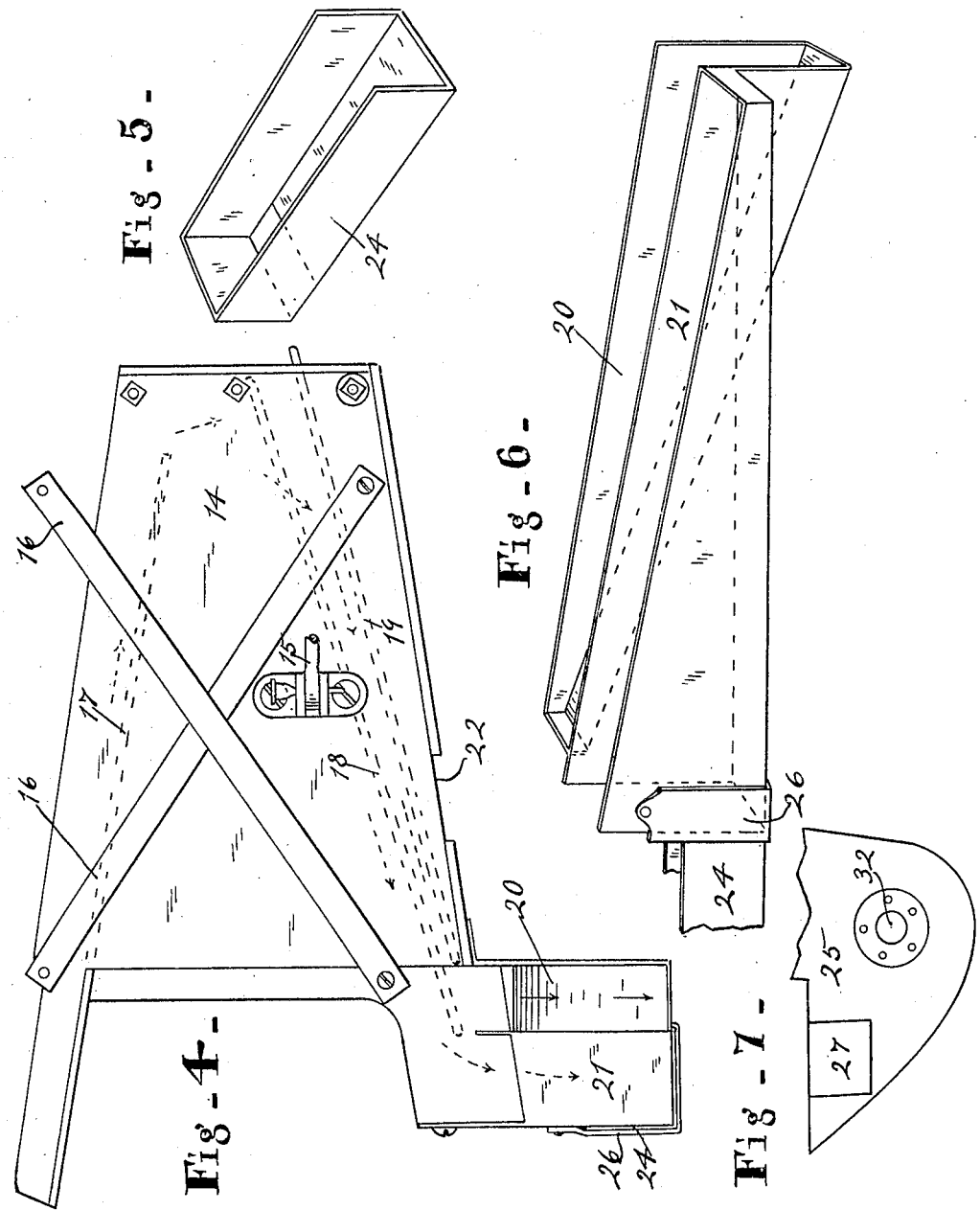
WITNESSES:
INVENTOR.
Perry Poyneer.
BY
ATTORNEY.

UNITED STATES PATENT OFFICE.

PERRY POYNEER, OF DECATUR, INDIANA.

FANNING-MILL.

No. 876,012.  Specification of Letters Patent.  Patented Jan. 7, 1908.

Application filed December 13, 1906. Serial No. 347,684.

*To all whom it may concern:*

Be it known that I, PERRY POYNEER, of Decatur, county of Adams, and State of Indiana, have invented a certain new and useful Fanning-Mill; and I do hereby declare that the following is a full, clear, and exact description thereof, reference being had to the accompanying drawings, in which like letters refer to like parts.

The object of this invention is to provide new and improved means for receiving and disposing of the different qualities of grain turned out by a fanning mill. To that end an elevator is detachably connected with one side of the fanning mill and adapted to receive the best quality of grain and elevate it and discharge it into a bag whereby said grain may be suitably sacked. This sacks the major portion of the grain. A considerable minor portion consisting of grain of an inferior quality is separately discharged into a suitable vessel. These and the other features of the invention will be understood from the accompanying drawing and the following description and claims.

In the drawings Figure 1 is an elevation of the right-hand side of the fanning mill, parts being shown by dotted lines. Fig. 2 is a vertical transverse section on the line 2—2 of Fig. 1, and with one board removed from the casing of the elevator. Fig. 3 is a horizontal transverse section of the forward portion of the machine on the line 3—3 of Fig. 2. Fig. 4 is a side elevation of the shoe or shaker and the straps for supporting the same and the troughs into which it discharges the grain. Fig. 5 is a perspective view of the trough extension for the elevator. Fig. 6 is a perspective view of the troughs with the trough extension to the elevator partly broken away. Fig. 7 is an inside elevation of the lower part of the elevator casing, the upper portion thereof being broken away.

This fanning mill is the shape and contains the parts of the ordinary type of fanning mill. There are four posts 10 to which sides 11 are secured. The rear portion is provided with a semicircular fan casing 12 in which a fan, not shown, is mounted on the fan shaft 13. In front of the fan a shaker 14 is suspended so as to be laterally reciprocated by suitable shaking means and here shown acting through the pivoted end 15 of a suitable bellcrank. This shoe or shaker 14 is suspended by a pair of diagonally extending bars 16 on each side of the machine, the upper end of said bars being pivotally connected with the side walls 11 of the machine and extending downward diagonally, crossing each other and pivoted at their lower ends to the lower portion of the side wall of the shoe or shaker. This gives a very substantial connection and yet a connection that admits of ample freedom for lateral movement.

The shoe or shaker contains a suitable riddle or separator 17 above set in an inclined position, as indicated by dotted lines in Fig. 4, from the forward end of which the larger particles of material and grain drop upon a separator or riddle 18 below. This riddle 18 extends rearward beyond the trough 20 and discharges into the trough 21. In the usual fanning mill the separating riddle 18 is of a larger mesh than the riddle 19 below it, so that the larger grain will discharge from the riddle 18 and the smaller grain and chaff fall upon the riddle 19. This smaller grain is discharged from said riddle 18 into the trough 20 at the rear, while the chaff passes through said riddle 19 and out through the opening 22 in the bottom of the shoe or shaker. These riddles 17, 18 and 19 are of the ordinary type familiar to all acquainted with fanning mills.

The two troughs 20 and 21, as shown in Fig. 6, are secured together and secured to the shoe or shaker so as to vibrate therewith. They have bottoms inclining in opposite directions so that the trough 20 discharges into the half bushel measure 23 at the right-hand side of the machine, while the trough 21 discharges the good grain into the elevator 25 through the elevator trough extension 24. This trough extension 24 has an open end in which the end of the trough 21 rather tightly fits. Said extension 24 fits in a stirrup 26 that is pivoted to the trough 21, as seen in Figs. 4 and 6. This arrangement permits the ready removal or attachment of the trough extension 24. The outer end of the trough extension 24 is closed, as seen in Fig. 5, and projects through the opening 27 in the lower part of the elevator 25, as appears in Figs. 1, 2, 3, and 7.

In the elevator 25 there is a conveyer 30 having on it suitable buckets 31 to elevate the grain discharged into the elevator. Said conveyer 30 operates over a shaft 32 at the bottom of the elevator and a shaft 33 at the top, and said last mentioned shaft is driven by means of a pulley 34, belt 35, and pulley 36, the latter on the fan shaft 13. The elevator at its upper end is provided with a sack spout 37 from which a bag or sack is suspended to receive the grain, said bag being fastened to hooks 38, one being upon each side of the elevator at the upper end. While operating the machine, the bag is hung on said hooks until filled with grain, so that the machine sacks the grain as it cleans it.

The elevator 25 is detachably secured to the side of the fanning mill by means of the plates 40, one near the top and one near the bottom of said elevator, that have forwardly and rearwardly extending portions through which bolts 41 extend for securing them to the side wall of the fanning mill. Therefore, this elevator is attachable or detachable readily, and can be used or not used for sacking the grain, as desired.

What I claim as my invention and desire to secure by Letters Patent is:

The combination of a fanning mill having a downwardly inclined grain discharge trough, a stirrup secured thereto near the discharge end, a trough extension held by friction between said stirrup and fanning mill trough, and a sacking elevator connected with and supported by the fanning mill with an opening into the lower end thereof into which said trough extension discharges, substantially as set forth.

In witness whereof, I have hereunto affixed my signature in the presence of the witnesses herein named.

PERRY POYNEER.

Witnesses:
JOHN C. MORAN,
SHAFFER PETERSON.